(12) United States Patent
Chan et al.

(10) Patent No.: US 7,146,697 B2
(45) Date of Patent: Dec. 12, 2006

(54) SEAL REMOVAL TOOL

(75) Inventors: Joanne T. Chan, Anniston, AL (US); Richard S. Stoltz, Oxford, AL (US); Jack M. Hurlbut, Weaver, AL (US)

(73) Assignee: Honeywell International, Inc., Morristown, NJ (US)

(*) Notice: Subject to any disclaimer, the term of this patent is extended or adjusted under 35 U.S.C. 154(b) by 337 days.

(21) Appl. No.: 10/819,777

(22) Filed: Apr. 6, 2004

(65) Prior Publication Data

US 2005/0217096 A1 Oct. 6, 2005

(51) Int. Cl.
E21B 33/13 (2006.01)

(52) U.S. Cl. .......................................... 29/235; 29/278

(58) Field of Classification Search ................ 29/235, 29/255, 263, 268, 272, 280, 282
See application file for complete search history.

(56) References Cited

U.S. PATENT DOCUMENTS

| 1,804,843 | A | | 5/1931 | Santiago |
|---|---|---|---|---|
| 1,992,474 | A | | 2/1935 | Currier |
| 2,380,068 | A | | 7/1945 | Patton |
| 2,497,633 | A | | 2/1950 | Shapiro et al. |
| 2,646,619 | A | * | 7/1953 | McCord ...................... 29/263 |
| 2,895,361 | A | * | 7/1959 | Collett ......................... 81/445 |
| 2,971,254 | A | | 2/1961 | Fairfield |
| 3,252,210 | A | | 5/1966 | Bowden |
| 3,611,540 | A | | 10/1971 | Gibu |
| 3,651,557 | A | | 3/1972 | Bagley |
| 3,709,546 | A | | 1/1973 | Vaughan |
| 3,727,490 | A | | 4/1973 | Diffenderfer et al. |
| 3,729,789 | A | | 5/1973 | Otto |
| 3,871,057 | A | | 3/1975 | Moulin |
| 4,003,119 | A | | 1/1977 | Hugh |
| 5,158,331 | A | | 10/1992 | Wesselski et al. |
| 5,195,794 | A | | 3/1993 | Hummel, Jr. et al. |
| 6,152,423 | A | | 11/2000 | Nichols |
| 6,237,168 | B1 | | 5/2001 | Daniel, III et al. |
| 6,385,846 | B1 | | 5/2002 | Hayashi |
| 6,415,487 | B1 | | 7/2002 | Leimer |
| 6,536,088 | B1 | | 3/2003 | Chiang |
| 2005/0217096 | A1 | * | 10/2005 | Chan et al. .................... 29/235 |

FOREIGN PATENT DOCUMENTS

DE    35 19 660 A1    12/1986

OTHER PUBLICATIONS

PCT International Search Report PCT/US2005/011445, Oct. 6, 2005.

* cited by examiner

Primary Examiner—Lee D. Wilson
(74) Attorney, Agent, or Firm—Ingrassia Fisher & Lorenz

(57) ABSTRACT

A tool for removing a seal is provided, wherein the seal has a grooved inner peripheral surface. The tool comprises a tubular member and at least two jaws. The tubular member has inner and outer surfaces, and first and second ends and a passage therebetween. First and second slots are formed between the tubular member inner and outer surfaces, and each equally spaced apart from one another about a predetermined axis. First and a second jaws are at least partially slidably disposed in the first and second slots, respectively, and each jaw has an outer peripheral surface having at least one protrusion formed thereon. The protrusion is configured to mate with the grooved inner peripheral surface. Each jaw is configured to selectively radially expand away from and retract toward the predetermined axis.

12 Claims, 4 Drawing Sheets

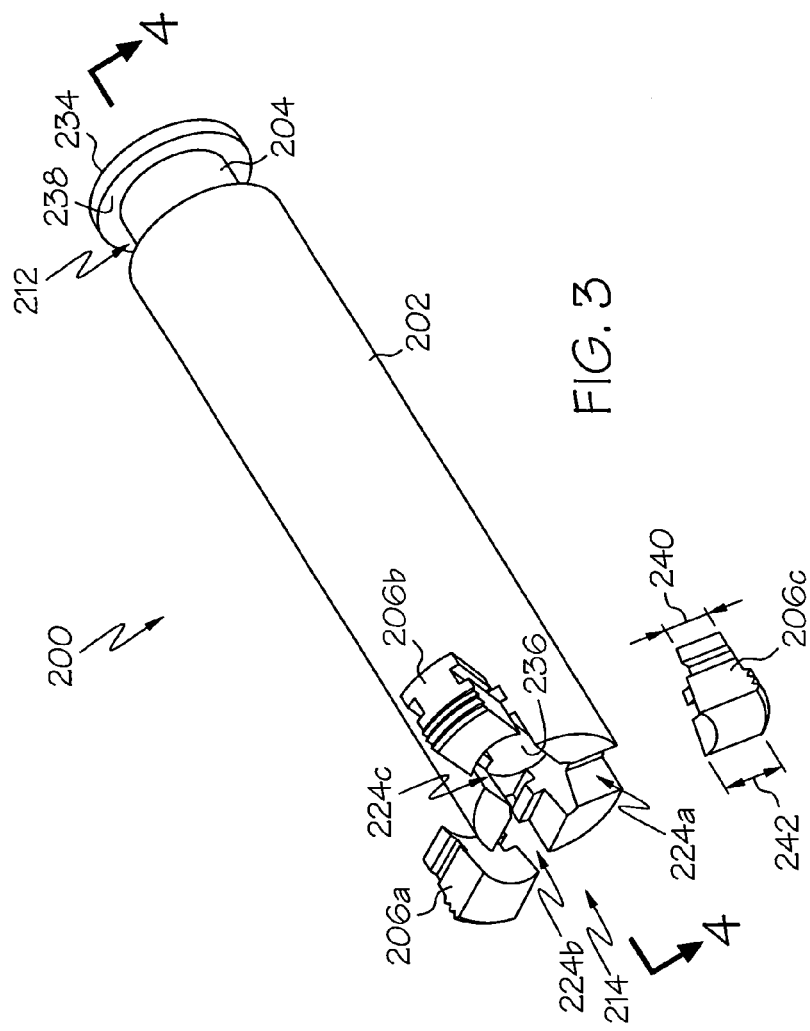
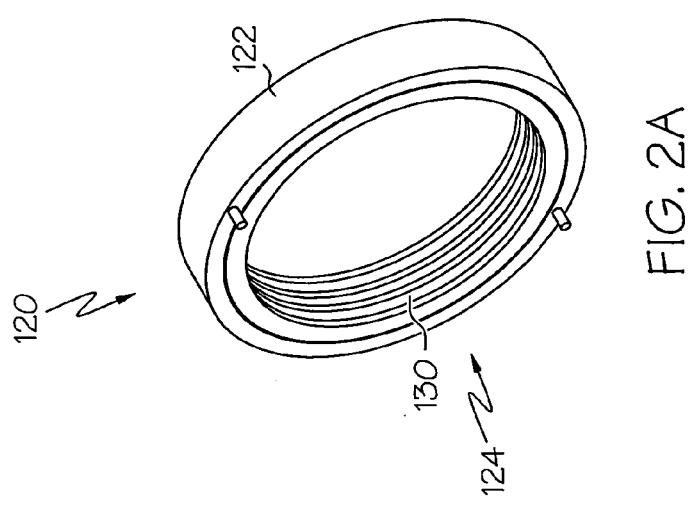

SEAL REMOVAL TOOL

FIELD OF THE INVENTION

The present invention relates to seals, and more particularly, to a tool for removing a seal from an air cycle machine.

BACKGROUND OF THE INVENTION

Seals are used in myriad applications in various types of machines. Seals may be constructed of any one of numerous types of materials, such as, for example, polymers, plastics, and carbon, depending on the purpose for which they may be used and the environments to which they may be exposed. One example within which seals are used is in an air cycle machine.

Air cycle machines ("ACM") may be used in aircraft to provide conditioned and/or compressed air to various parts of the aircraft, such as, for example, the passenger cabin, pilot compartment, or other sections needing a controlled environment. ACMs generally comprise a turbine module, compressor module, and a fan module, each mounted about a common shaft. At least one of the modules may be pressurized or otherwise environmentally-controlled, resulting in pressure differentials between at least two of the modules. Consequently, it may be preferable for these modules to be sealed from one another and/or from the ambient environment. Carbon seals are commonly used for this purpose.

Typically, a carbon seal is mounted between one of the modules and the shaft to prevent leakage of pressurized air or, possibly, lubricants, from the module interior to other portions of the aircraft. However, at times, just as with any aircraft component, the ACM may need to undergo maintenance, repair, or overhaul. In such instances, the ACM may need to be partially or completely disassembled to separate the modules from one another and to expose certain ACM components. Disassembly may include removal of the carbon seal.

Conventional means of removing carbon seals have called for the use of tools that may damage the seal. When the seal is initially intact and then damaged during a removal process, unwanted debris may be undesirably left within the modules, thereby reducing the time span between scheduled maintenance, or causing other undesired consequences. Moreover, carbon seals are generally relatively expensive to replace, thus, if the carbon seal is initially undamaged, it is preferable for the seal not to be damaged during the removal process so that it can be reused when the ACM is assembled.

Thus, there is a need for a seal removal tool that does not damage the seal during a removal process. Additionally, it is desirable to have a tool that does not cause the seal to leave unwanted debris in an area from which the seal is removed. The present invention addresses one or more of these needs.

SUMMARY OF THE INVENTION

The present invention provides a tool for removing a seal, wherein the seal comprises a grooved inner peripheral surface.

In one embodiment, and by way of example only, the tool comprises a tubular member and at least two jaws. The tubular member has inner and outer surfaces, and first and second ends and a passage therebetween. The first and second slots are formed between the tubular member inner and outer surfaces and are equally spaced apart about a predetermined axis. The first and second jaws are each at least partially disposed within the first and second slots, respectively. Each jaw has an outer peripheral surface having at least one protrusion formed thereon. The protrusion is configured to mate with the grooved inner peripheral surface of the seal. Each jaw is configured to selectively radially expand away from and retract toward the predetermined axis.

In another embodiment, the tool comprises a tubular main body, slots, a shaft, and jaws. The tubular main body has first and second ends, a passage that extends therebetween, and inner and outer surfaces. The first and second slots are formed between the main body inner and outer surfaces and are equally spaced apart about a predetermined axis. The shaft is slidably disposed within the passage and having first and second ends, the first end configured to receive mechanical pressure to move the shaft through the passage. The first and second jaws, are each at least partially slidably disposed in the first and second slots, respectively. Each jaw has inner and outer peripheral surfaces, wherein the first and second jaw inner surfaces are configured to contact the shaft second end to thereby radially expand the first and second jaw to an expanded configuration in response to the mechanical pressure applied to the shaft, and the first and second jaw outer surfaces each have at least one groove formed thereon and configured to correspond with the seal grooved surface.

In yet another embodiment, a method for using the tool for removing a seal in an air cycle machine is provided. The method comprises the steps of disassembling the air cycle machine to expose a space in which the seal is positioned, inserting the radially expanding tool and positioning the tool proximate the seal, radially expanding the first and second jaws, and lifting the tool and seal out of the space.

Other independent features and advantages of the preferred tool will become apparent from the following detailed description, taken in conjunction with the accompanying drawings which illustrate, by way of example, the principles of the invention.

BRIEF DESCRIPTION OF THE DRAWINGS

FIG. 2A is a close up perspective view of a carbon seal that may be employed in the ACM depicted in FIG. 2;

FIG. 3 is a perspective view of an embodiment of the seal removal tool;

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Moreover, although the inventive tool is described herein as being used to remove a carbon seal in an air cycle machine, it will be appreciated that the tool may be used to remove any type of seal, or otherwise ring-shaped object, that may be used or employed for any application, including, but not limited to, other types of machines.

Figure 1:
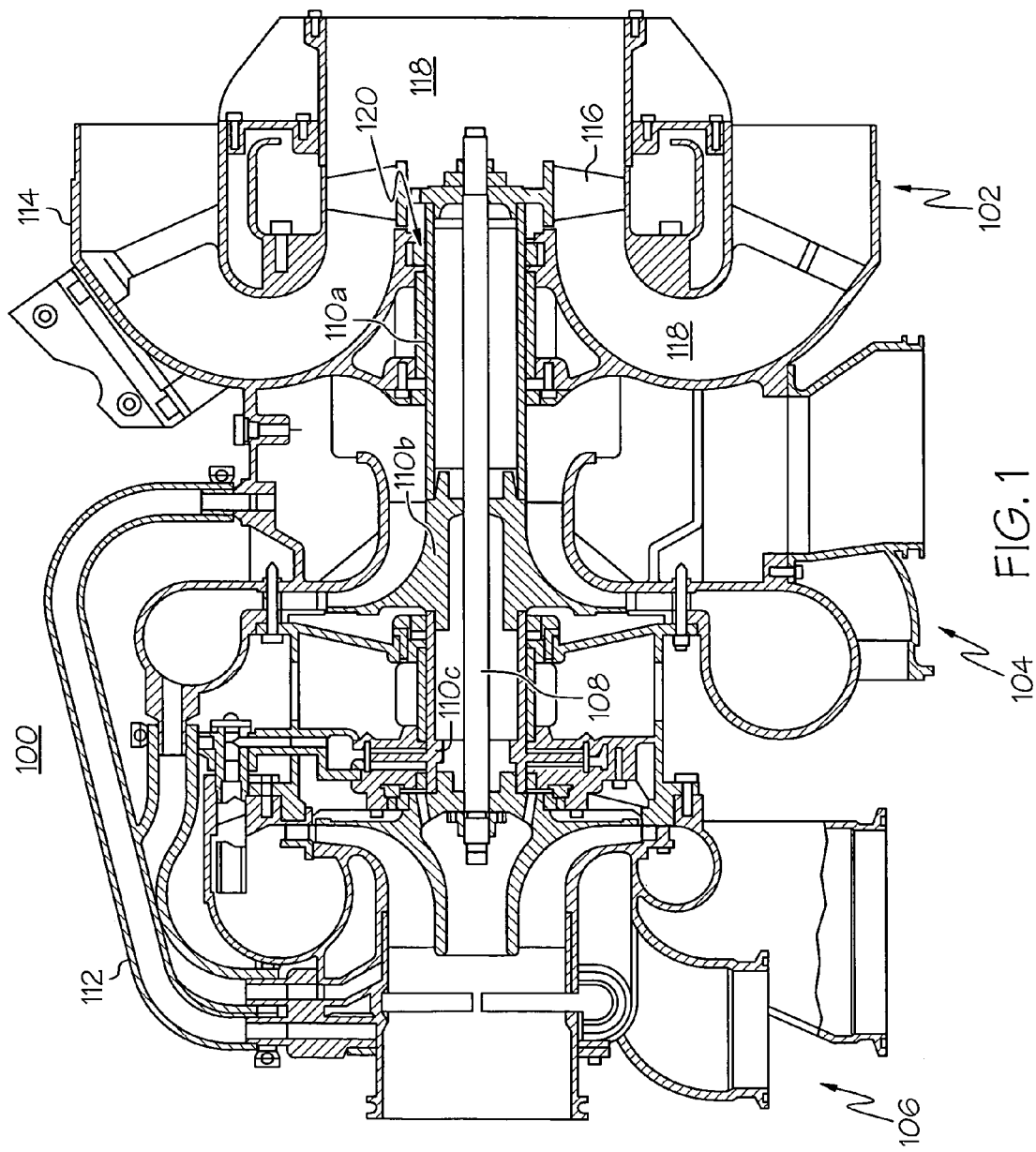
FIG. 1 is a cross section side view of an air cycle machine with which an embodiment of the seal removal tool of the present invention may be employed.

FIG. 1 illustrates an exemplary air cycle machine having a carbon seal that may be removed using an embodiment of the tool. The ACM 100 includes a fan module 102, a compressor module 104, and a turbine module 106 which are each rotationally mounted about a common shaft or tie bolt 108. Each module 102–106 includes a shaft 110a–110c, that is configured to mate with one another. The modules 102–106 are disposed within a housing 112, part of which is illustrated herein, which can comprise a plurality of housing plates.

The fan module 102 further comprises a diffuser case 114 and a fan 116. The diffuser case 114 defines, in part, a passage 118 through which air that is induced into the ACM 100 by the fan 116 may travel. To keep the air in the passage 118 and prevent the air from leaking into the other portions of the ACM 100, a carbon seal 120 is sealingly coupled between the fan module shaft 110a and diffuser case 114.

Figure 2:
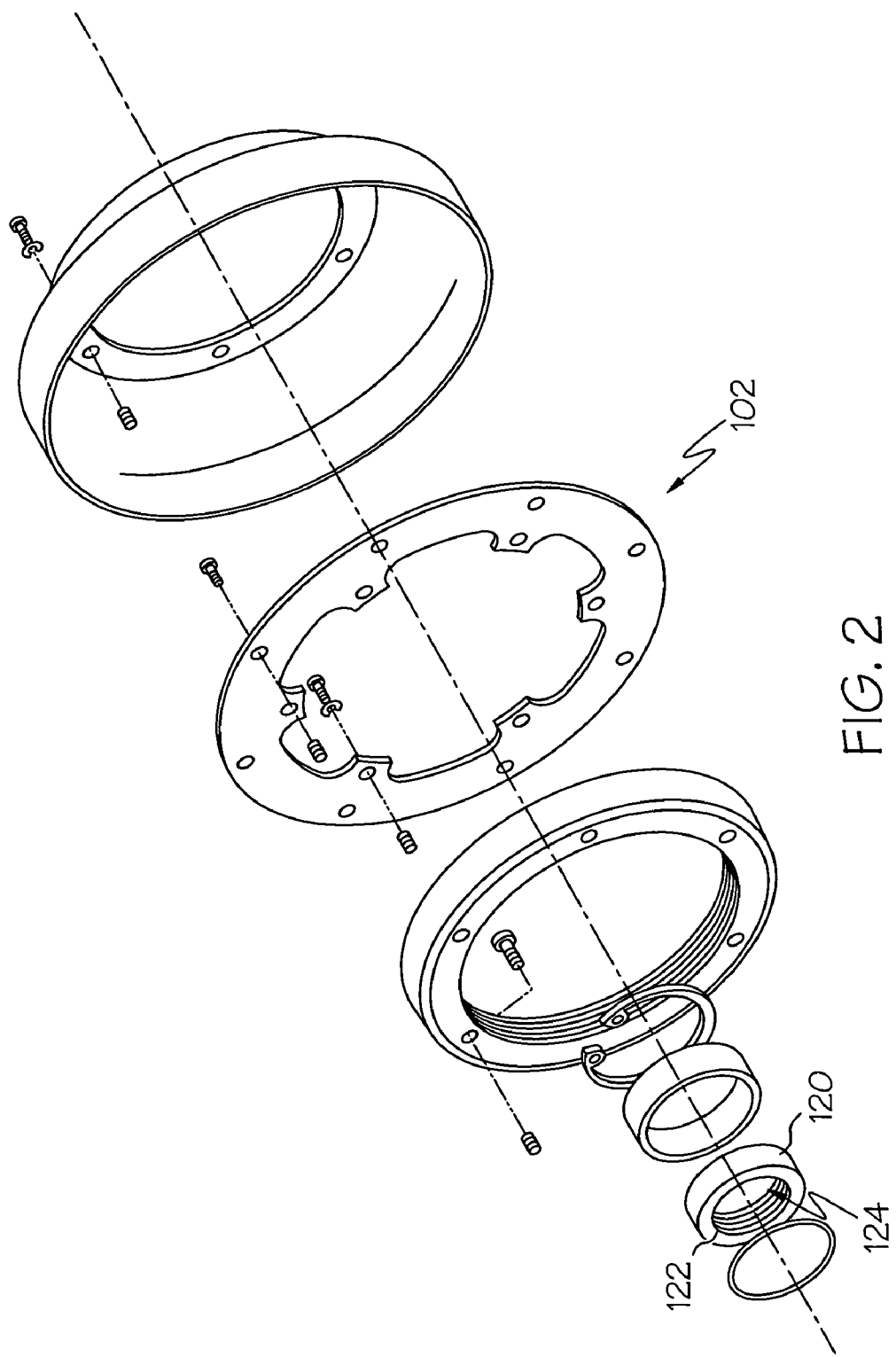
FIG. 2 is an exploded view of the air cycle machine of FIG. 1.

FIGS. 2 and 2A illustrate an exploded view of a portion of the fan module 102 in FIG. 1, and a close-up view of the carbon seal 120. The carbon seal 120 is generally ring-shaped, or otherwise configured to be mounted around, in this case, a tube-shaped shaft, and includes an outer peripheral surface 122 and an inner peripheral surface 124 that defines an opening 126 therethrough. At least one groove, or alternatively, a flange 130 extends around the circumference of the inner peripheral surface 124. As will be appreciated by those with skill in the art, the seal inner peripheral surface 124 may alternatively include threading, channels formed between at least two protrusions, or any one of numerous other formations on the inner peripheral surface 124 that may be employed to aid in sealing the seal 120 against the shaft 110a. The groove or flange 130 can alternately extend around only a portion of the inner peripheral surface 124 and not the entire circumference, in which case, optionally, more than one groove or flange 130 may be formed along the inner peripheral surface 124.

When the ACM 100 is disassembled, the carbon seal 120 is preferably removed using the tool 200 illustrated in FIG. 3. The tool 200 includes an elongated main body 202, a shaft 204, and jaws 206a–206c.

Figure 4:
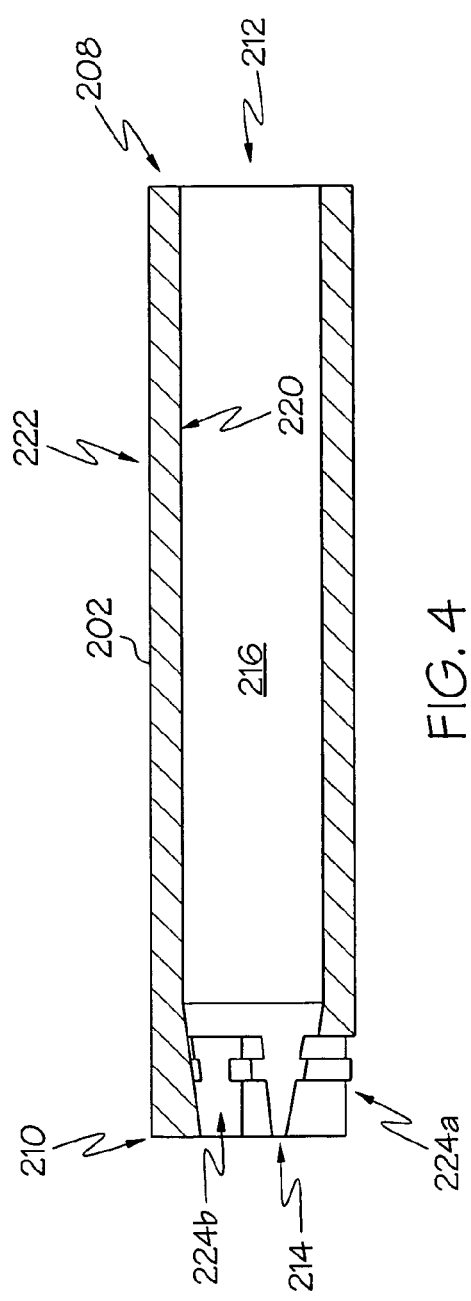
FIG. 4 is a cross section view of the seal removal tool depicted in FIG. 3 taken along line 4—4.

Referring both to FIGS. 3 and 4, the elongated main body 202 is generally tubular and cylindrically shaped and comprises first and second ends 208, 210 which include first and second openings 212, 214, respectively. The main body 202 can be constructed of numerous materials, such as, for example, metal alloys, aluminum, and steel. A passage 216 extending between the two openings 212, 214 is configured to movably receive the shaft 204. In one embodiment of the invention, the first opening 212 of the elongated main body 202 is sized and dimensioned so that one end of the shaft 204 extends through the first opening 212 and out of the passage 216 to thereby provide access to the shaft 204 so that it can be mechanically moved back and forth in the passage 216. In another embodiment, the shaft 204 does not extend out of the first opening 212, but is accessible to be moved in the passage 216, such as via another opening or coupling to another component that moves the shaft 204 therein.

The elongated main body 202 further includes inner and outer peripheral surfaces 220, 222 and can include at least one slot that extends therebetween that is configured to receive the jaws 206. In the depicted embodiment, three slots 224a–224c are shown formed on the elongated main body second end 210. However, as those with skill in the art may appreciate, the slots 224a–224c can be formed in any portion along the length of the elongated main body 202, such as proximate the middle. Moreover, those skilled will appreciate that the number of slots formed in the elongated main body 202 may be less than three or more than three. Preferably, the number of slots matches the number of jaws employed with the main body 202, in which case, the shape of each slot is configured to substantially correspond with the shape of the jaw to be received. However, more than one jaw can be disposed within one slot so long as the slot is suitably configured to accommodate such a configuration. Each slot is preferably formed to allow the jaws to slidably and radially move therethrough.

The slots 224, hence, the jaws 206, are substantially equally spaced apart from one another along a circumference of the main body 202, and about a predetermined axis that preferably extends through the center of the circumference. The reason for this preferred configuration will become clearer later in the description. Thus, if two slots or more than three slots are employed, each slot 224, hence, each jaw 206, is equally spaced from one another. In another embodiment, one slot is configured to receive more than one jaw. In this configuration, the placement of the slot is not as important as the positioning of the jaws, namely, in case more than one jaw is employed, each jaw is preferably equally spaced apart from the others.

The jaws 206a–206c are coupled to the elongated main body 202 about a predetermined axis. The jaws 206a–206c and main body 202 may be coupled to one another in any fashion. Preferably, the jaws 206a–206c are coupled in such a way so as to be capable of radial movement to at least an expanded configuration. Optionally, the jaws 206a–206c may be coupled so that they may be retracted as well. In the depicted embodiment, the jaws 206a–206c are each friction fit into the corresponding slots 224a–224c and are manually retractable. However, as will be appreciated, the jaws 206a–206c can be configured to be retracted without manual intervention. Although shown to be disposed within slots 224a–224c, the jaws need not be coupled in such an arrangement, and can alternatively, be coupled to the main body 202 via wires, or any one of other types of coupling mechanisms that are configured to provide radial movement of the jaws 206a–206c.

In one embodiment of the invention, the radial movement of the jaws 206a–206c is facilitated by applying force to at least a portion of the jaws 206a–206c to thereby cause the jaws 206a–206c to move outward. This can be accomplished in one of numerous ways, such as, for example, via the shaft 204. In the embodiment shown in FIGS. 3 and 4, the shaft 204 and jaws 206a–206c are configured to engage one another so that as the shaft 204 is moved in the passage 216 of the elongated main body 202, it forces the jaws 206 radially outward.

Figure 5B:
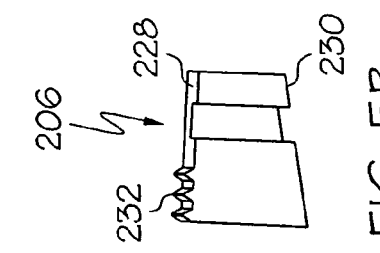
FIG. 5B is another close-up perspective view of the component illustrated in FIG. 5A.
Figure 5A:
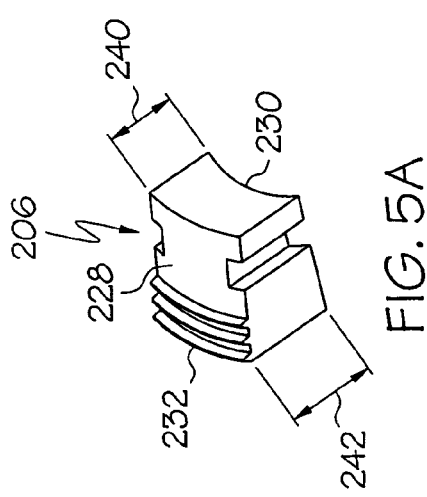
FIG. 5A is a close-up perspective view of another component that may be employed in the embodiment of the seal removal tool depicted in FIG. 3.

Two close-up views of one embodiment of a jaw 206 that may be used with the tool 200 are provided in FIGS. 5A and 5B. The jaw 206 includes outer and inner peripheral surfaces 228, 230. The inner peripheral surface 230 is configured to provide a surface with which the shaft 204 can contact, while the outer peripheral surface 228 includes at least one groove or flange 232 formed thereon that is configured to interface, and/or mate with the groove or flange 130 that is located on a seal to be removed. The jaws 206a–206c can be constructed of any type of material, including, but not limited to, plastics, such as acetal homopolymers (Delrin® manufactured and sold by DuPont Company of Del.), polytetrafluoroethylene, and metal alloys.

Figure 6:
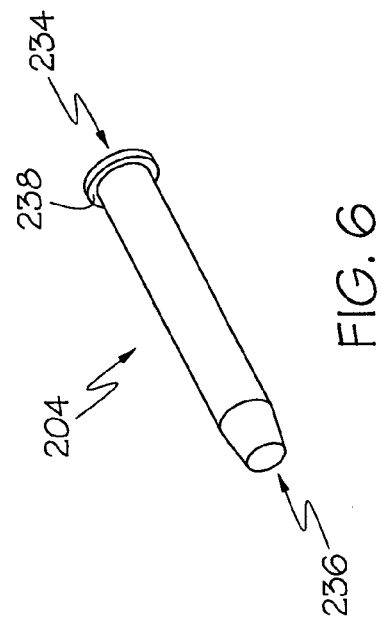
FIG. 6 is a close-up perspective view of a component that may be employed in the embodiment of the seal removal tool depicted in FIG. 3.

Referring to FIGS. 3, 4, and 6, the shaft 204 is slidably disposed within the passage 216 of the elongated main body 202 and comprises first and second ends 234, 236. The shaft first end 234 is configured to receive mechanical pressure to slide the shaft 204 back and forth through the passage 216. To this end, the shaft first end 234 can include a knob or handle 238, or any other mechanism coupled thereon to provide an enlarged surface area that a user can depress or pull up.

The shaft second end 236 preferably comprises a mechanism by which to push the jaws 206a–206c radially outward from the elongated main body 202. Any one of numerous configurations can be employed to achieve this result, as long as, as will be appreciated, the configuration of the shaft second end 236 corresponds to the configuration of the jaw 206 to be operated. In the embodiment shown in FIGS. 5A, 5B, and 6, the shaft second end 236 is tapered or funnel-shaped and the jaws 206a–206c are each beveled such that the portion of the jaw 206 closest to the second opening 214 of the main body 202 has width 240, measured from the inner surface to the outer surface of the jaw, that is less than the width 242 of the jaw 226 that is furthest from the second opening 214.

In another embodiment, the shaft 204 comprises at least one projection located thereon that can itself be mechanically radially expanded to supply a force to the jaw 206 or jaws 206a–206c to push them radially outward into an expanded configuration.

When the tool 200 is used to remove a seal, the tool 200 is inserted into the shaft 110a of the fan module 102 of a disassembled ACM 100. The shaft 110a is exposed by first removing the ACM housing 112 to expose the fan module 102, compressor module 104, and turbine module 106. The tie bolt 108, around which the modules are mounted, is removed causing each module to separate from one another. The fan module 102 is separated from the compressor module 104 and the shaft 110a around which the fan 116 is mounted is removed to expose a space in which the carbon seal 120 is located.

Once the seal 120 is exposed, the tool 200, in a retracted configuration is inserted into the space. The tool 200 is axially positioned such that the jaws 206a–206c are substantially in radial alignment with the grooves or protrusions 130 on the seal 120. Once properly positioned, the first end 234 of the shaft 204 is depressed to thereby cause the jaws 206a–206c to radially expand. The grooves 232 on the jaws 206a–206c which correspond with the grooves 130 on the seal 120 grip the seal 120. When the seal 120 is sufficiently gripped, the tool 200 and the gripped seal 120 are removed from the space.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A tool for removing a seal having a grooved inner peripheral surface, the tool comprising:
   a tubular main body having first and second ends, a passage that extends therebetween, and inner and outer surfaces;
   first and second slots formed between the main body inner and outer surfaces equally spaced apart about a predetermined axis;
   a shaft slidably disposed within the passage and having a first end and a tapered second end, the first end configured to receive mechanical pressure to move the shaft in the passage; and
   a first and a second jaw, each at least partially slidably disposed in the first and second slots, respectively, each jaw having a beveled inner surface and an outer peripheral surface, wherein the beveled inner surface is configured to mate with the shaft tapered second end and to thereby radially expand the first and second jaw to an expanded configuration in response to the mechanical pressure applied to the shaft, and the first and second jaw outer peripheral surfaces each have at least one groove formed thereon configured to correspond with the seal grooved inner peripheral surface.

2. The tool of claim 1, wherein the tubular main body first and second ends each have an opening, and wherein the shaft second end extends out of the opening of the tubular member second end.

3. The tool of claim 1, wherein the at least two slots are located on the tubular main body first end.

4. The tool of claim 1, further comprising:
   a third slot formed between the tubular main body inner and outer surfaces, the third slot equally spaced apart from the first and second slots and disposed about the predetermined axis.

5. The tool of claim 4, further comprising
   a third jaw at least partially slidably disposed in the third slot, third jaw having inner and outer peripheral surfaces, the outer peripheral surface having at least one flange thereon configured to mate with the seal grooved peripheral surface and configured to selectively radially expand away from and refract toward the predetermined axis.

6. The tool of claim 1 wherein the first jaw has first and second ends, each having a width measured from the first jaw beveled inner surface and outer peripheral surface, the first jaw beveled inner surface is beveled such that the width of the first jaw first end is less than the width of the first jaw second end.

7. The tool of claim 1 wherein the first and second slots are formed on the main body second end.

8. The tool of claim 1, wherein the tubular main body comprises aluminum.

9. The tool of claim 1, wherein the jaw comprises acetal homopolymer.

10. The tool of claim 1, wherein the jaw comprises polytetrafluoroethylene.

11. A method for removing a seal in an air cycle machine, wherein the air cycle machine comprises a seal mounted on a shaft, and the seal comprises a grooved inner peripheral surface, the method comprising the steps of:
    disassembling the air cycle machine to expose a space in which the seal is positioned;
    inserting a radially expanding tool and positioning the tool proximate the seal, the tool comprising:

a tubular main body having first and second ends, a passage that extends therebetween, and inner and outer surfaces;

first and second slots formed between the main body inner and outer surfaces equally spaced apart about a predetermined axis;

a shaft slidably disposed within the passage and having first and second ends, the first end configured to receive mechanical pressure to move the shaft through the passage; and a first and a second jaw, each at least partially slidably disposed in the first and second slots, respectively, each jaw having inner and outer peripheral surfaces, the first and second jaw outer surfaces each having at least one groove formed thereon and configured to correspond with the grooved inner peripheral surface;

radially expanding the first and second jaws; and lifting the tool and seal out of the space.

12. The method of claim 11, wherein the step of radially expanding further comprises the step of:

imparting mechanical pressure on the shaft first end to move the shaft in the passage and to radially expand the first and second jaws to cause contact between the jaws and the grooved inner peripheral surface to grip the seal.

* * * * *

UNITED STATES PATENT AND TRADEMARK OFFICE
CERTIFICATE OF CORRECTION

| | |
|---|---|
| PATENT NO. | : 7,146,697 B2 |
| APPLICATION NO. | : 10/819777 |
| DATED | : December 12, 2006 |
| INVENTOR(S) | : Chan et al. |

It is certified that error appears in the above-identified patent and that said Letters Patent is hereby corrected as shown below:

Column 6, line 43, "refract" should be changed to --retract--.

Signed and Sealed this

Fifteenth Day of May, 2007

JON W. DUDAS
*Director of the United States Patent and Trademark Office*